3,262,138
DOUBLE-TAPERED SPRING ASSEMBLY
Richard R. Knittel, Martinsville, N.J., assignor to Union
Carbide Corporation, a corporation of New York
Filed Mar. 3, 1964, Ser. No. 349,092
9 Claims. (Cl. 5—353)

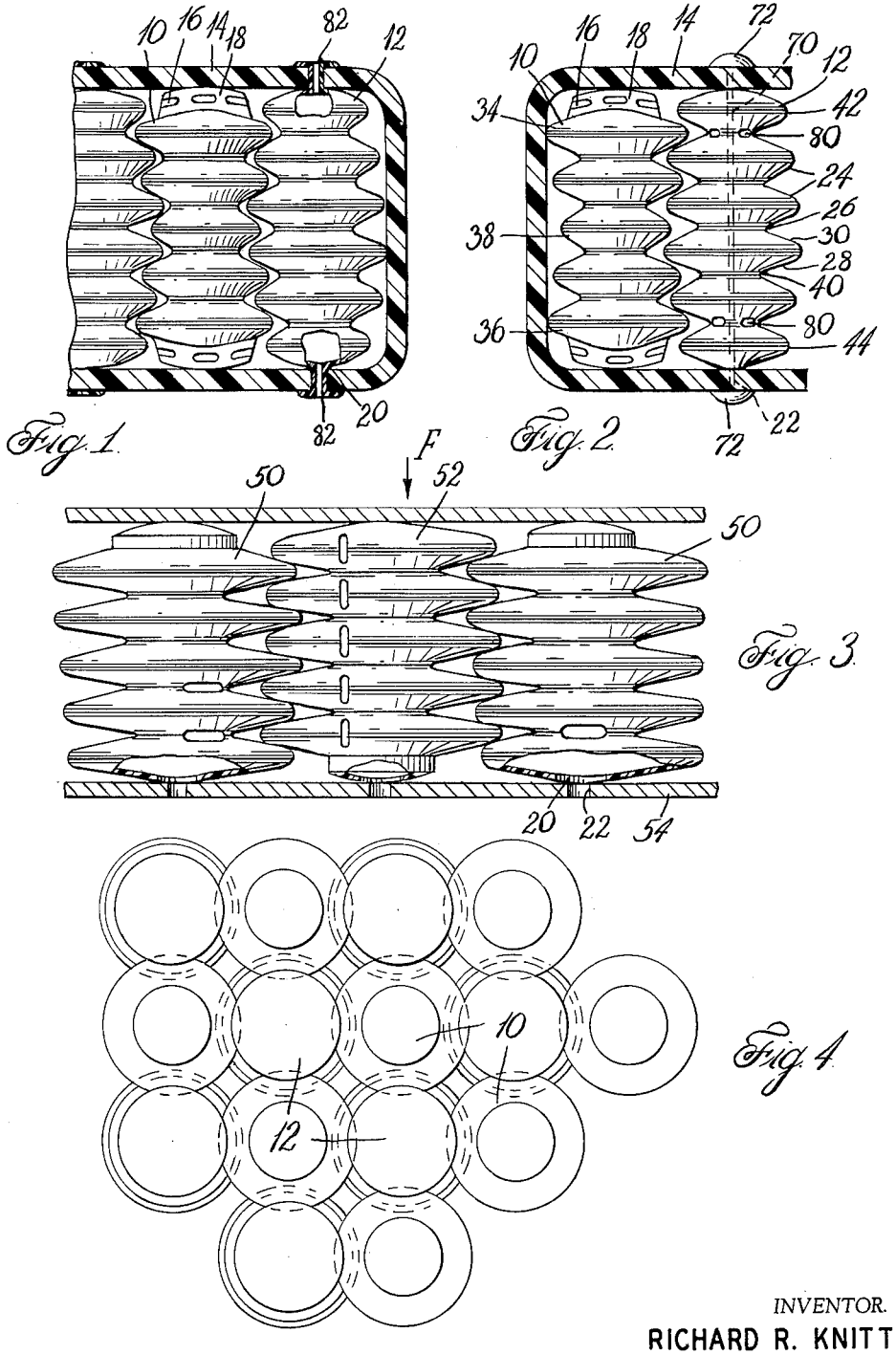
July 26, 1966 R. R. KNITTEL 3,262,138
DOUBLE-TAPERED SPRING ASSEMBLY
Filed March 3, 1964 2 Sheets-Sheet 1
INVENTOR.
RICHARD R. KNITTEL
BY
ATTORNEY July 26, 1966 R. R. KNITTEL 3,262,138
DOUBLE-TAPERED SPRING ASSEMBLY
Filed March 3, 1964 2 Sheets-Sheet 2
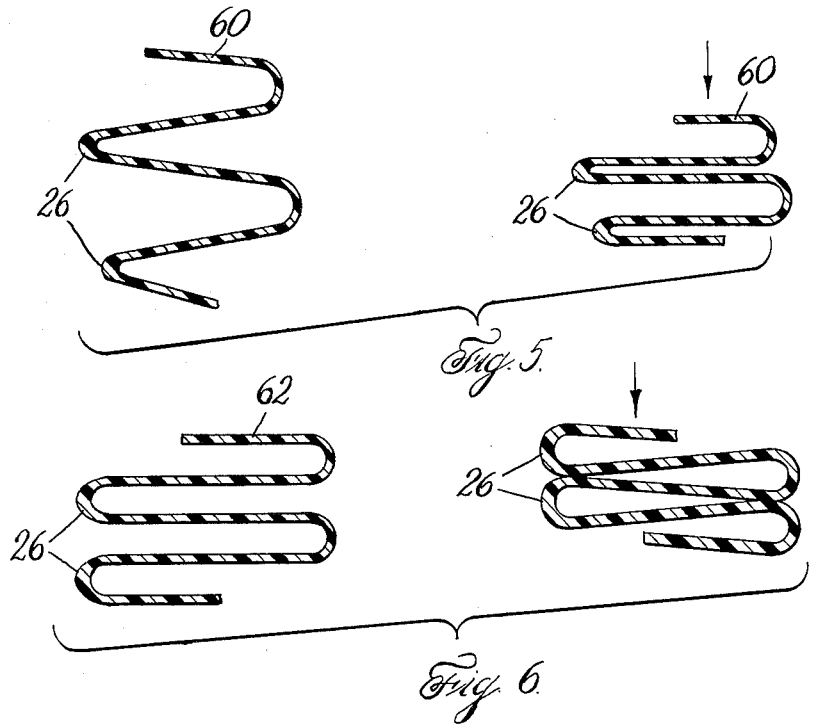
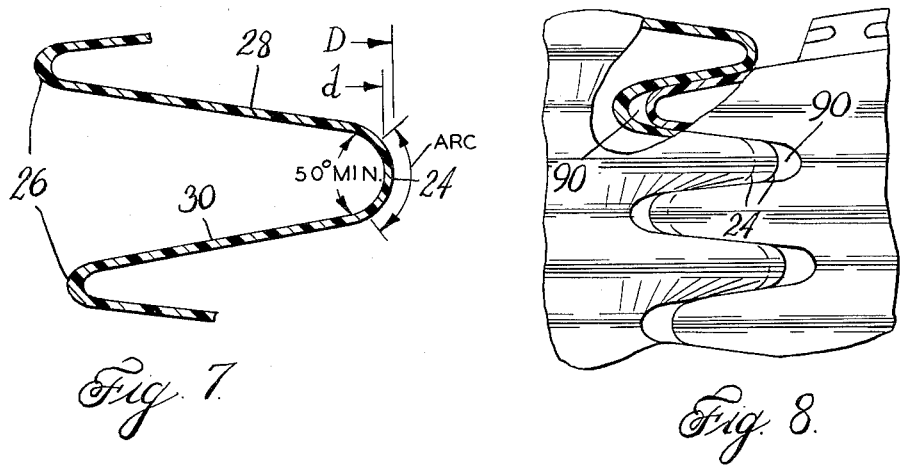
INVENTOR.
RICHARD R. KNITTEL
BY
ATTORNEY United States Patent Office 3,262,138
Patented July 26, 1966

This invention relates to a resilient load-supporting assembly, and more particularly to a vented, double-tapered bellows spring cushioning assembly, especially for furniture, mattresses and automotive seating.

The vented bellows assembly disclosed and claimed in U.S. patent application Serial No. 256,376, filed February 5, 1963, and entitled, "Molded Body Support," achieves improved design, strength, comfort, stability and economy over conventional structures which include (1) coil springs, (2) foam, (3) sealed pneumatic chambers, and (4) arch springs.

As noted in the above application, coil-spring assemblies, although providing stability and variable firmness in selected zones of the article, are expensive, complex in structure, and require extensive hand labor to tie the springs together. Foam material ordinarily has one spring constant, does not breathe properly, and is relatively costly to produce due to the expense of foaming molds and of coring for bottom cavities.

Sealed air chambers are expensive to manufacture and maintain, are not durable, and create the sensation of instability to a person resting on them. This is due to their "balloon" type action and behavior with only slight compressibility. The plastic covered arch-type supports used with modern style seating, are not adaptable to many applications such as, for example, mattresses.

In contrast to these, the vented bellows spring construction simultaneously provides improved stability, simplicity of construction, proper breathing, variable firmness in selected zones of the article, inexpensive construction, durability and other advantages inherent in the assembly.

It has been discovered that certain pattern arrangements and interengagements of the bellows springs, especially when coupled with specific structural features of the individual springs, achieve a remarkably superior stability, reaction zone control, and variability in spring resistance to the entire article assembly and in various zones thereof.

The aforementioned patent application discloses a resilient load support of the vented bellows type, having a unique interaction exhibiting a multiple-cushioning effect which is greater than the simple cumulative or additive effect of a plurality of individual springs. The novel support has remarkably greater strength than the prior type. The resistance to further compression becomes greater and greater with increased compression under load. The intermeshed bellows springs normalize and integrate the deflection resistance of the individual springs.

It is further disclosed that in multiple-spring, support construction the load applied downwardly on the springs can be uniquely transmitted laterally across the springs, without the use of tie wires or bands between or across the springs as is conventionally necessary. This occurs even independently of the cover sheet. Moreover, the internal force transmission occurs at all vertical levels of the springs, rather than just at the top as with conventional ties.

It is further noted in the patent application that a body support construction having a large total deflection or compression distance with respect to the height of the bellows springs and the number of bellows in each spring may be provided by arranging the inner junctures between the individual bellows, where the plastic wall thickness is especially thick in a radially displaced pattern. This prevents the plastic from accumulating and consequently unduly limiting maximum deflection of the springs under compression.

Also disclosed is a bellows spring having a gradual spongy bottoming action, having increased total deflection capacity for its height, capable of unique interfitting action, and capable of variable firmness when used in prearranged patterns with other like bellows springs. The bellows spring has a relatively large angle between the legs of each bellows and is capable of repeated deep compression, without significant permanent set resulting.

The foregoing features are highly desirable in mattresses. However, the intermeshed assembly requires anchorage of a large number of the bellows springs to a support member such as a rigid plywood board and therefore precludes the use of two surfaces in the manner customary for mattresses.

It is, therefore, an object of this invention to provide a bellows spring assembly which does not require anchorage to a rigid support.

It is a further object of this invention to provide a reversible bellows spring support.

According to the present invention a resilient load support device such as a mattress is formed from a plurality of resilient vented bellows springs arranged in an intermeshed pattern, and a cover which substantially encloses the bellows springs.

Each of the springs has a tapered configuration. The taper of one portion of springs converges outwardly from an intermediate point towards the ends and the taper of another portion of springs diverges outwardly from an intermediate point towards the ends.

Each spring in one portion of springs intermeshes with at least one spring in the other portion of springs to a predetermined depth thereby causing the springs to act cooperatively over a reaction zone when a load is applied to at least one of the springs in the zone.

Other objects and advantages of the invention will be appreciated, and the invention will be better understood from the following specification wherein the invention is described by reference to the embodiments illustrated in the accompanying drawings wherein;

FIGURE 1 is a fragmentary, elevational view, partly in section, of a resilient load support device of this invention;

FIGURE 2 is a fragmentary, elevational view, partly in section, of a modification of a resilient load support device of this invention;

FIGURE 3 is a fragmentary, elevational view, partly in section, of a resilient load support device employing single tapered springs;

FIGURE 4 is a plan view of the spring pattern in an assembly of the springs of FIGURE 2;

FIGURE 5 is a fragmentary sectional view of the action of a tapered spring under compression loading;

FIGURE 6 is a fragmentary sectional view showing the action spring of uniform diameter under compression loading;

FIGURE 7 is a fragmentary sectional view showing an arcuate outer diameter hinge; and FIGURE 8 is a fragmentary elevational view of a pair of interacting, partly compressed bellows springs.

Basically the reversible mattress includes a plurality of vented resilient bellows springs 10 and 12 and a cover member 14.

Each of the bellows springs comprises a hollow undulated wall formed of series of adjacent interconnected individual bellows of a resilient polymer. As shown in FIGURE 1, the internal chamber defined by the integrally interconnected individual bellows is freely vented to the atmosphere through suitable vent openings 16 formed in the cap 18 of the spring 10 or through the opening 20 in the spring 12 which are aligned with orifices 22 in cover 14.

While polymeric materials in general may be employed for the springs, and polyolefins such as polypropylene or some other equivalent polymer such as a polymer of an ethylene ethylacrylate mixture or a butadiene polymer give good results, low density polyethylene exhibits only slight permanent set while providing adequate strength and resiliency and is therefore preferred.

The blow molding process is preferred for the production of the springs because of the low cost of the molds and the rapidity and accuracy of the process in reproducing springs of identical characteristics. Also springs of varying wall thickness can be formed with the same mold. This process is preferred also because of the desirable physical characteristics of the polymeric wall resulting from the polymer being forced radially into the mold while blow molding, and because of a double action compression that results causing each individual spring to compress in two stages when compressed singly.

The wall thickness of the blown spring may be varied by variation of the wall thickness of the initial hollow parison to be blown, and/or by variation of the initial diameter of the parison with respect to the mold. Wall characteristics also vary with the polymeric material employed.

The blow molding process causes the wall of the outer peripheral extremities 24 of the individual bellows to be thinner than the inner extremities 26, with the change in thickness being gradual over the legs. These arcuate outer extremities 24 have the least resistance to flexing, and therefore, comprises unique hinges which flex controllably over the entire arcuate surface. Each flexible outer hinge is integral with and joins the radially outwardly converging legs 28 and 30 of each individual bellows, and is formed by the arcuate portion extending from one leg to the other.

Almost the entire deflection of each spring, when compressed singly, is a result of the flexure of the outer flexible juncture hinges, with only slight flexing occurring in the legs during spring compression under load. The flexing characteristics of the outer junctures depend upon the thickness of the junctures as well as the materials and the arcuate configuration thereof.

The thicker walled, inner junctures constitute the most rigid portion of the bellows construction. Therefore, when each spring is compressed singly, the inner junctures 26 flex only after the outer junctures 24 have flexed considerably. This creates a unique double-action, since the initial compression or partial deflection of the spring is "soft," and occurs readily under a relatively light load, with flexure of the outer, thin, arcuate hinges. This is followed by a second partial depression, due to flexure about the inner junctures, but only under a substantially greater load.

This effect creates good comfort, yet without abrupt bottoming. This double-action is reduced considerably between intermeshed springs due to a normalizing effect to be discussed hereinafter, but is believed to be present even then to some extent depending upon the degree of intermeshing, to provide optimum comfort when balanced with other characteristics. It will be noted that when the springs are not intermeshed, each spring acts singly except for load distribution by the cover sheet.

For optimum intermeshing and stability and for maximum compression without bottoming the springs are tapered from an intermediate point to their ends.

As shown in FIGURE 1, one set of springs 10, has a taper which converges inwardly from the ends 34 and 36 to the central portion 38. The other set of springs 12, has a taper which converges outwardly from the central portion 40 to the ends 42 and 44. Obviously, because of the undulating spring wall, the term taper is intended to refer to an "overall" or average taper. Thus, in the spring 10, the diameters of the bellows decrease with decreasing distance from the central portion of the spring.

The "double taper" of the springs 10 and 12 serves to lock the springs together and thus adds stability to the assembly. The springs with a single taper employed in an upright (50) and inverted (52) alternate pattern as shown in FIGURE 3, require a rigid support 54 in order to prevent a force F applied to the top of the inverted spring 52, from pushing the inverted spring past the adjoining upright springs 50.

As seen in FIGURE 1, in a double-taper spring assembly, every spring has a section in which a large bellows overlies a small bellows. In the inwardly converging bellows 10, it is the upper half and in the outwardly converging bellows 12, it is the lower half in which a large bellows overlies a small bellows. Thus, in double-tapered spring assemblies, an interlocking arrangement is obtained since a large bellows cannot move into the position occupied by the lower, smaller bellows.

The tapered construction provides improved intermeshing between the springs. With the exception of an outermost spring, each inwardly converging spring 10 is surrounded by an intermeshed with a plurality of outwardly converging springs 12 shown in FIGURE 4 to be four in number. Each outwardly converging spring is likewise surrounded by a plurality of four inwardly converging springs. The amount of taper is limited, since, if the degree of taper is too large for the length of the spring, the ends of the outwardly converging springs and the midpoint of the inwardly converging springs becomes too small while the ends of the inwardly converging springs and the midpoint of the outwardly converging springs becomes excessively large. When this happens, the excessive enlargement of the end bellows of the springs 10 and the center bellows of the springs 12 provide hinges of such reduced wall thickness that their action is impaired and they fail to act in unison with the other bellows. Also, the top surface of the assembly becomes deeply sculptured due to failure of the small ends of bellows springs 12 to occupy fully the gap between adjacent springs 10. This lessens both the utility and the stability of the pattern.

The tapering also achieves another important function to be explained with reference to FIGURES 5 and 6. Referring to FIGURE 6 which illustrates a bellows spring of uniform diameter, it will be seen that in such a spring the inner junctures 26 tend to accumulate directly upon each other when the spring is compressed. These inner junctures have a substantial wall thickness and to the blow molding process. This accumulation of plastic material unnecessarily limits the total deflection of the spring. Thus, the total deflection of the spring from its fully expanded state, to the totally compressed state as shown in FIGURE 6, does not utilize the full capacity of the several interconnected bellows. As contrasted to this, the tapered bellows construction shown in FIGURE 5, enables the expanded bellows 60 to be compressed substantially farther since, when compressed the same amount as bellows 62 of FIGURE 6, the inner junctures do not seat directly one upon the other. Rather, each inner juncture is radially displaced from the others. The total deflection possible from the springs is therefore, much greater before "bottoming" occurs. Further, with the tapered configuration, if bottoming does occur, it is less abrupt, and the effect is cushioned or "spongy."

In the normal uncompressed state, the angle between the legs 28 and 30 of each bellows should be greater than an angle of about 50° minimum in order to obtain a proper blow-molded hinge. If the angle is significantly less than this, the wall thickness of the outer arcuate hinge tends to be too thin because of the difficulty of forcing the polymer into the corresponding mold cavities. Thus, it is too weak to supply its share of support. Also, the bellows tends to have an insufficient range of flexure, since the total flexure of each bellows is determined largely by the initial angle of separation of its legs. The combination of these two factors detrimentally lessens the spring support below a useful amount. However, it has been found that if the angle is about 50° or greater, when using the ordinary sharp apex on the outer juncture, the fiber stress in the plastic of the outer hinge becomes so great that a permanent set results.

However, it has been found that the novel arcuate outer hinge configuration enables these large angles to be employed, yet without the occurrence of significant permanent set. This is believed to be because the flexing action occurs over the entire arcuate area rather than at a concentrated sharp apex. Whatever the technical explanation happens to be, the fact remains that those two normally incompatible, and very important characteristics are thus made completely compatible, thereby making bellows springs extremely useful.

This arcuate configuration has been found to be advantageous for other reasons also. This feature, coupled with others, causes the springs to have a "spongy" rather than an abrupt bottoming action under maximum compression. The resistance to compression increases with increasing lead, and just prior to maximum compression, the resistance increases generally exponentially, i.e., the increase is rapid, but still at a rate, instead of instantaneously, so that a certain springiness remains even at the point of bottoming rather than a harsh, abrupt, unpleasant halt. The arcuate configuration is also of utmost importance for the squeezing and hinge bulging action occurring under load when the springs are intermeshed as will be explained hereinafter.

While each of the bellows springs is shown to be generally circular in configuration, i.e., a double-tapered cylinder, each can also, conceivably be of polygonal cross-sectional configuration. It should also be noted that while each of the bellows springs is shown to have a single point at which the direction of taper changes in order to yield a double-tapered configuration, each spring can have a plurality of points at which the direction of taper changes thus yielding a plurality of double tapered sections.

When the springs are placed in a predetermined pattern at calculated spacings, at least some springs are anchored, as attachment to cover 14. This may be done in several ways, one of which as shown in FIGURE 2, is by means of elongated tie members 70 having caps 72 at each end. Each tie member extends through openings at the ends of the outwardly converging springs 12 through an opening in the cover 14, and is secured at each end to the cover by enlarging the head, or with other suitable securing means such as a button. Additional vent exhausts 80 are advantageously employed to supplement the end vents of the springs 12, because the cupped ends of the ties tend to restrict the air from the ends of the bellows springs 12. The tie member preferably is a flexible member which folds when the spring is depressed. When the load on the spring is released, it straightens until it reaches a maximum length, at which point it limits further axial expansion of the spring.

This method of anchoring is illustrative only. Other methods can be just as readily employed. With the springs 12 of FIGURE 1 for example, the tubular ends are bead sealed or otherwise sealed at the edges 82 of the tubular ends of the springs to the cover member 14. Attachment may be by stapling, adhesion, or some other equivalent rather than through holes on both ends.

The cover member 14 serves to enclose the bellows springs and to retain them in their nested or intermeshed relationship. It, therefore, need only be made of a decorative nonstretching material capable of acting through the tie members or to other attachment means to prevent lateral displacement of springs. Advantageously, the cover member can be an elastomeric material such as foamed rubber, polyurethane foam, a foamed vinyl polymer or the like and thereby provide a padding over the bellows springs. The elastomeric material can obviously be used in combination with a sheet material such as heavy gauge cloth or plastic. The plastic sheet is advantageously porous in order to provide for proper venting of the bellows springs.

In use, when a load is applied to a focal point anywhere on the flexible cover of the resilient load-supporting device, the load is distributed over several of the bellows springs. If the springs are not intermeshed, distribution must take place solely due to flexing of the nonstretching cover. However, the springs are preferably intermeshed due to the unique interaction resulting. When so intermeshed, the forces created by a load are actually transmitted laterally between springs in an area, i.e., radially out from the area of concentrated load application. This interaction causes the major load distribution. This will occur even in the absence of any load distributing effect of the flexible covering. A relatively small zone of reaction is involved, compared to conventional coil spring structures. Yet the zone is sufficiently large to prevent discomfort caused by concentrated resistance to depression, or caused by abrupt bottoming. This zone of reaction assumes the form of a gradually varying concavity since the springs being deflected or compressed, deflect and tip adjacent springs lesser and lesser amounts to provide optimum form fitting and cushioning characteristics. The degree of reaction is graduated outwardly in all directions from the focal point of the lead. As the springs are compressed, the air within the bellows spring is vented freely through openings 16, 20 or 80 in the springs, and an opening in the cover if necessary. The important thing is that there is insignificant pneumatic resistance to interfere with the controlled cushioning effect obtained by the flexing of the hinge arc and intermeshed bellows.

Experimentation with the intermeshed springs has shown the surprising result that the total support capacity of a plurality of the springs is far greater than the expected additive support capacity of the individual springs. Upon closer study of the novel assembly, it was determined that the total resilient support effect is due to at least three individual effects.

The first effect involves the expected cumulative resistance to deflection of the several springs due to individual hinge resistance to flexing under load. The second effect involves the frictional resistance between bellows of adjacent springs as they extend radially outwardly with compression and slide together. The third effect, and perhaps the most important, involves the necessity of the compressed bellows, and especially the arcuate outer ends, to bulge radially outwardly into the adjacent grooves, and their increasing resistance to this action as the springs are squeezed further together, causing the free arcuate ends to constantly decrease in size. Each of those resistance forces increases markedly with each increment of further compression. All of those factors cooperate to achieve the final result. Consequently, an explanation of each factor, taken separately, is really incomplete. However, for clarity, each will be described briefly.

Regarding the first factor, as any one or a few springs are compressed under a concentrated load, the compressed bellows immediately contact and depress adjacent springs. Since each spring can tilt somewhat, as one side is depressed by another spring, the opposite side will only partially depress as the spring tilt occurs. The next spring will tilt also and be depressed a lesser amount. This continues until the effect is dissipated over the zone of reaction. Of course, the cover also causes partial distribution of the load.

Since the legs of each bellows engage the legs of two straddling bellows of each adjacent spring, and since axial compression of a spring causes radial expansion, (see e.g., the normal position shown in phantom in FIGURE 8 as contrasted to the partially compressed position shown in solid, in FIGURE 8) these legs must slide over one another during compression, producing the second effect above. The frictional drag and increasing interference fit resulting, causes total deflection to be less than would be expected from the additive effect of the springs since total resistance to deflection is greater. Moreover, after partial compression and deflection has occurred, further deflection requires an increasingly greater force because the pressure between the rubbing, sliding legs becomes even greater, causing the frictional resistance to sliding to be greater. This increasing resistance factor occurs over the total deflection of the spring.

The third reaction mentioned above still further increases this changing resistance to deflection due to the steadily decreasing portion of the outer juncture arcuate hinge remaining free to bulge into the cooperative groove of the adjacent spring. More specifically, referring to FIGURE 8 as the outer arcuate hinge moves radially outwardly from the position shown in phantom when the spring is expanded, to the position shown in solid where the spring is partially compressed, the free arc length or size has decreased substantially. This decrease continues as each bellows is squashed, and must bulge into smaller and smaller sections of the groove 90. The resistance to further radial expansion therefore increases markedly, requiring greater axial load to achieve another increment of spring deflection. This important effect supplements the two effects previously noted, to provide a spring with optimum qualities, with initial deflection occurring readily, and with each additional increment of deflection requiring a greater-than-proportionate force. Hence, the multiple action effect occurs.

The three effects taken together cause the several individual untied springs to react in a unitary fashion, with dissipation of the applied force occurring laterally, radially outwardly from the point of concentration. The lateral force distribution moreover occurs between all levels of adjacent springs, rather than just across the tops of the springs.

The amount of the double-action, referred to with respect to the compression of each spring, that remains in the intermeshed assembly, depends upon the degree of intermeshing. If the bellows are only slightly overlapping, a significant double-action effect remains, with the outer junctures deflecting first, and the inner junctures deflecting significantly only after substantial spring compression. With full intermeshing, however, the thinner, high flexible, outer junctures are adjacent the thicker, slightly flexible, inner junctures of adjacent springs so that flexing of the outer junctures tends to force some flexing about the inner junctures, producing an overall normalizing effect. This further integrates the individual springs into a cooperative whole with substantially different, and highly advantageous characteristics.

The degree to which the springs are intermeshed controls not only the amount of compression which can occur before interaction is effective, but the degree to which interaction is effective in restraining the action of the individual spring. Thus, by the simple expedient of varying the degree of intermesh, the effective resistance of the assembly to a given load can be varied as required. This can be done throughout an entire assembly or it can be varied in selected zones to produce an almost endless pattern of load resistance variation. Thus, in a single assembly the resistance can be varied from that characteristic of springs acting as individual components which bottom relatively quickly to areas where the springs are so tightly intermeshed that compression is effectively limited to only a small portion of the total axial length of the spring. It will be understood that such variations are readily incorporated in the assembly without costly tooling, manual labor or significant increase in material costs. An article of furniture can be assembled with greater resistance to deflection in zones of weight concentration, and lesser resistance to deflection in varying degrees in other zones.

The cushioning effect or resistance to compression of each zone can be varied in another way, that is, by inserting springs of different wall thickness. This thickness is varied by altering the amount of material in the unblown parison introduced into the mold cavity, by varying the parison wall thickness or the parison diameter, or both. Actually, the resistance to flexing by the wall is proportional to the cube of the wall thickness. Thus, by doubling the thickness, for example, the resistance to compression is increased by 8 times. This is controlled for each bellows in accordance with the following relationship:

$$\frac{P}{Y_{max.}} = \frac{E(\pi)(D+d)t^3 \text{ av.}}{(D-d)^3}$$

where $P$ = load or weight on spring (pounds)
$Y$ max. = deflection at inner juncture (inches)
$E$ = flexural modulus of polymer
$D$ = diameter at outer juncture (hinge arc) (inches)
$d$ = diameter at inner juncture (inches)
$t$ av. = average thickness of material in outer arc (inches)

When this equation is applied to a bellows having sharp apex type junctures, D is the outer juncture and $d$ is the inner juncture. However, when applied to a bellows having arcuate junctures and intermeshed with a bellows of an adjacent spring, D is still the largest diameter of the outer arcuate juncture or hinge arc, but $d$ becomes the diameter of the inner limit or point to tangency of the hinge arc with the legs 28 and 30 of the bellows (see FIGURE 7). Actually, since the springs are tapered this value will vary from bellows to bellows, so that the overall value for each spring involves a very complicated mathematical function of several of these equations.

When the springs are blown from a material such as a low density polyethylene the resulting equation for deflection of the spring can be expressed as a factor of the weight of the spring in relation to its length. For example, the K-factor (deflection factor) of a pattern of 61 or more five inch springs of the design of FIGURE 3 in pounds per square inch, compressive stress, per inch of deflection is 108 times the weight of the spring in pounds cubed. For a seven inch spring this factor is 39.5 times the weight of the spring cubed.

It will be obvious to those having ordinary skill in the art that each supporting device can be made with custom characteristics to suit the use of the device. To this end, the final assembly can be tailored to the flexibility desired, the configuration of the article, the zonal variations required, the edge support needed, the amount of resiliency necessary and many other such factors. Although the invention has been described in its preferred forms with a certain degree of particularity, it is understood that the present disclosure of the preferred forms has been made only by way of example and that numerous changes in the details of construction and the combination and arrangements of parts may be resorted to without departing from the spirit and the scope of the invention as hereinafter claimed.

What is claimed is:

1. A resilient load supporting device comprising a plurality of resilient vented bellows springs arranged in an intermeshed pattern and a cover substantially enclosing said bellows springs, each of the bellows springs having a tapered configuration, one portion of springs having a taper converging outwardly from an intermediate portion towards the end, another portion of springs having a taper diverging outwardly from an intermediate portion towards the ends and each spring in said one portion of springs intermeshing with at least one spring in said another portion of springs thereby causing said springs to act cooperatively and expand radially over a reaction zone when a load is applied to at least one of the springs in said zone.

2. A resilient load supporting device comprising a plurality of resilient vented bellows springs arranged in an intermeshed pattern and a cover substantially enclosing said bellows springs, each of said bellows springs having a tapered configuration, one portion of springs diametrally increasing outwardly from the central portion towards the ends, another portion of springs diametrally decreasing outwardly from the central portion towards the ends, and each spring in said one portion of springs intermeshing with at least one spring in said another portion of springs thereby causing said springs to act cooperatively and expand radially over a reaction zone while a load is applied to at least one of the springs in said zone.

3. In a resilient load supporting device having a plurality of resilient vented bellows springs arranged in an intermeshed pattern and a cover substantially enclosing said bellows springs, the improvement comprising, each of said bellows springs having a tapered configuration from the central portion of the spring towards the ends of the spring, one portion of springs having a taper converging outwardly from the central portion towards the ends, another portion of springs having a taper converging inwardly from the ends towards the central portion, the concavity of each spring in said one portion of springs interfitting with the convexity of at least one spring in said another portion of springs and the bellows of said each spring in said one portion of springs intermeshing with the bellows of said at least one spring in said another portion of springs thereby causing said springs to act cooperatively and expand radially over a reaction zone when a load is applied to at least one of the springs in said zone.

4. The support of claim 3, wherein the outer portion of each bellows is arcuate in configuration.

5. In a resilient load supporting device having a plurality of resilient vented bellows springs arranged in an intermeshed pattern and a cover substantially enclosing said bellows springs, the improvement comprising each of said bellows springs having a tapered configuration from the central portion of the spring towards the ends of the spring, one portion of springs having a taper converging outwardly from the central portion towards the ends, another portion of springs having a taper diverging outwardly from the central portion towards the ends, the bellows of each spring in said one portion of springs intermeshing with the bellows of at least one spring in said another portion of springs thereby causing said springs to act cooperatively and expand radially over a reaction zone when a load is applied to at least one of the springs in said zone, and means for restricting the lateral displacement of at least a plurality of springs, thereby maintaining said springs intermeshed to a predetermined degree.

6. The device of claim 5, wherein said means for restricting the lateral displacement of at least a plurality of springs comprises elongated tie members, each of said tie members extending through a bellows spring and being secured at each end to said cover.

7. The device of claim 5, wherein said means for restricting the lateral displacement of at least a plurality of springs comprises means sealing at least one end of each of said plurality of springs to said cover.

8. A resilient load supporting device comprising, a plurality of resilient, bellows springs arranged in a closely spaced pattern, the inside of each spring being hollow and vented to the atmosphere, allowing substantially unhindered air flow in and out; the walls of each spring being formed of a series of integrally joined individual bellows collectively providing the resilient support of the spring; each bellows formed by a pair of outwardly converging legs having an outer juncture forming a resilient arcuate hinge biased to an expanded attitude; said bellows capable of being compressed varying amounts under load to flex said hinge, and of returning to the original expanded attitude upon removal of said load due to its inherent resilience, all without significant penumatic hindrance from air in said spring, each of said bellows springs having a tapered configuration from the mid-point of the spring to the ends of the spring, one portion of springs having a taper converging outwardly from the central portion towards the ends, another portion of springs having a taper diverging outwardly from the central portion towards the ends, each spring in said one portion of springs being intermeshed with at least one spring in said another portion of springs, and means for restraining the lateral displacement of at least a plurality of springs, thereby maintaining said springs intermeshed in a predetermined degree and providing a multiple cushioning between said springs.

9. The device of claim 8, wherein the depth to which said springs are intermeshed is different in different zones thereby creating zonal firmness variation.

References Cited by the Examiner

UNITED STATES PATENTS

| 755,729 | 3/1904 | White | 5—257 |
| 1,648,951 | 11/1927 | Knepper | 3—353 |
| 2,150,747 | 3/1939 | Naulty | 5—348 |
| 2,350,711 | 6/1944 | Amos | 5—348 |
| 2,979,739 | 4/1961 | Krakauer | 5—345 |
| 3,111,344 | 11/1963 | Hoven et al. | 297—452 |

FOREIGN PATENTS 914,505   10/1946   France.

OTHER REFERENCES 1,148,718. German printed application, Schneider, May 1953.

FRANK B. SHERRY, *Primary Examiner.*

C. A. NUNBERG, *Assistant Examiner.*